(12) United States Patent
Nishi

(10) Patent No.: US 7,768,675 B2
(45) Date of Patent: Aug. 3, 2010

(54) IMAGE FORMING APPARATUS

(75) Inventor: Takayuki Nishi, Fujisawa (JP)

(73) Assignees: Kabushiki Kaisha Toshiba, Tokyo (JP); Toshiba Tec Kasbushiki Kaishia, Tokyo (JP)

( * ) Notice: Subject to any disclaimer, the term of this patent is extended or adjusted under 35 U.S.C. 154(b) by 686 days.

(21) Appl. No.: 11/678,191

(22) Filed: Feb. 23, 2007

(65) Prior Publication Data

US 2008/0204814 A1  Aug. 28, 2008

(51) Int. Cl.
*H04N 1/21* (2006.01)
(52) U.S. Cl. .................. 358/296; 358/501; 347/186; 399/67
(58) Field of Classification Search .................. 358/296, 358/300, 303, 501, 503; 347/171, 185, 186, 347/187; 399/67, 69, 70
See application file for complete search history.

(56) References Cited

U.S. PATENT DOCUMENTS 4,439,143 A * 3/1984 Hanamoto et al. ............ 432/36

2007/0047989 A1 * 3/2007 Nakamura et al. ............ 399/67

FOREIGN PATENT DOCUMENTS

| JP | 06004005 A | * | 1/1994 |
| JP | 2004-069910 | | 3/2004 |
| JP | 2004-126328 | | 4/2004 |

* cited by examiner

*Primary Examiner*—Thomas D Lee
(74) *Attorney, Agent, or Firm*—Turocy & Watson, LLP

(57) ABSTRACT

An image forming apparatus according to an aspect of the invention includes: a media sensor that detects a type of a recording paper; a development unit configured to develop an image on the recording paper; a pair of rollers that fixes the image on the recording paper by nipping the recording paper bearing the image developed in the development unit and forcing the recording paper to pass by; a main heater that heats the pair of rollers by passing a current therethrough when the recording paper passes by; and an auxiliary heater that selectively heats at least one of the pair of rollers by passing a current therethrough when the recording paper passes by the pair of rollers in a case where the media sensor detects that the weight per unit of the recording paper or the thickness of the recording paper is equal to or greater than a specific value.

11 Claims, 4 Drawing Sheets

IMAGE FORMING APPARATUS

BACKGROUND OF THE INVENTION (1) Field of the Invention

The present invention relates to an image forming apparatus, such as a copying machine, a printer, and an MFP (Multi Function Peripherals), and more particularly, to an improvement of a heat fusing device for an image in the visible form.

(2) Description of the Related Art

For an MFP, media onto which are printed color images have been increasing. Taking print media of paper alone as an example, various types of paper that differ in thickness or the like are used. The types of paper are normally divided by the basic weight indicating a weight per a specific area (unit: $g/m^2$), and for example, papers that fall within the ranges of 64 to 105, 106 to 163, 164 to 209, 210 to 256, and 257 to 300 are referred to as plain papers, thick papers 1, thick papers 2, thick papers 3, and thick papers 4, respectively. These basic weights depend on the density and the thickness of papers, and given that the density of papers is almost constant, then the basic weights are proportional to the thickness.

When the thickness of papers varies with the types of papers as described above, optimal print conditions to achieve a satisfactory print image vary as well. Generally, when the thickness of papers is increased, the fixing temperature of an image in the visible form drops abruptly, and when fixing is performed on the images at the same temperature, a wait-stop occurs due to poor fixing and a drop in temperature, which makes it impossible to achieve a satisfactory print image. Hence, in order to achieve a satisfactory print image, it becomes necessary to determine the type of papers used for printing.

In order to identify the types of papers, the user used to input the thickness and the basic weight on the screen displayed on the control panel of the MFP, and the fixing of the image in the visible form is controlled and a paper carrying rate is controlled according to the thickness and the basic weight of papers thus inputted.

The user, however, is rarely aware of the thickness of papers or the like except when he sets print papers in the print paper accommodating cassette. Hence, papers of wrong type are set often and the user fails to obtain a satisfactory print image, which results in a waste of print papers.

As is disclosed in JP-A-2004-126328, there is an image forming apparatus, in which plural temperature detecting elements are provided to a heating member to determine the type of a recording material according to a difference of temperatures detected by the temperature detecting elements, and the fixing temperature is set according to the determination result. However, because plural temperature detecting elements are required and the fixing temperature is changed in response to a difference of the temperatures thereof, there are problems that it takes a time to reach an optimal fixing temperature, the mechanism becomes complex, and so forth.

BRIEF SUMMARY OF THE INVENTION

The invention was devised in view of the problems in the related art as discussed above, and therefore provides an image forming apparatus having an image fixing device capable of changing the fixing temperature or the like in response to the type of papers and thereby achieving a satisfactory print image swiftly.

In an aspect of the invention, an image forming apparatus is provided, which includes: a media sensor that detects a type of a recording paper by one of a weight per unit and a thickness of the recording paper; a development unit configured to develop an image on the recording paper; a pair of rollers that fixes the image on the recording paper by nipping the recording paper bearing the image developed in the development unit and forcing the recording paper to pass by; a main heater that heats the pair of rollers by passing a current therethrough when the recording paper passes by; and an auxiliary heater that selectively heats at least one of the pair of rollers using an auxiliary power supply when the recording paper passes by the pair of rollers by passing a current therethrough in a case where the media sensor detects that one of the weight per unit of the recording paper and the thickness of the recording paper is equal to or greater than a specific value.

DETAILED DESCRIPTION OF THE INVENTION

Hereinafter, embodiments of the invention will be described with the use of the drawings.

First Embodiment

Figure 1:
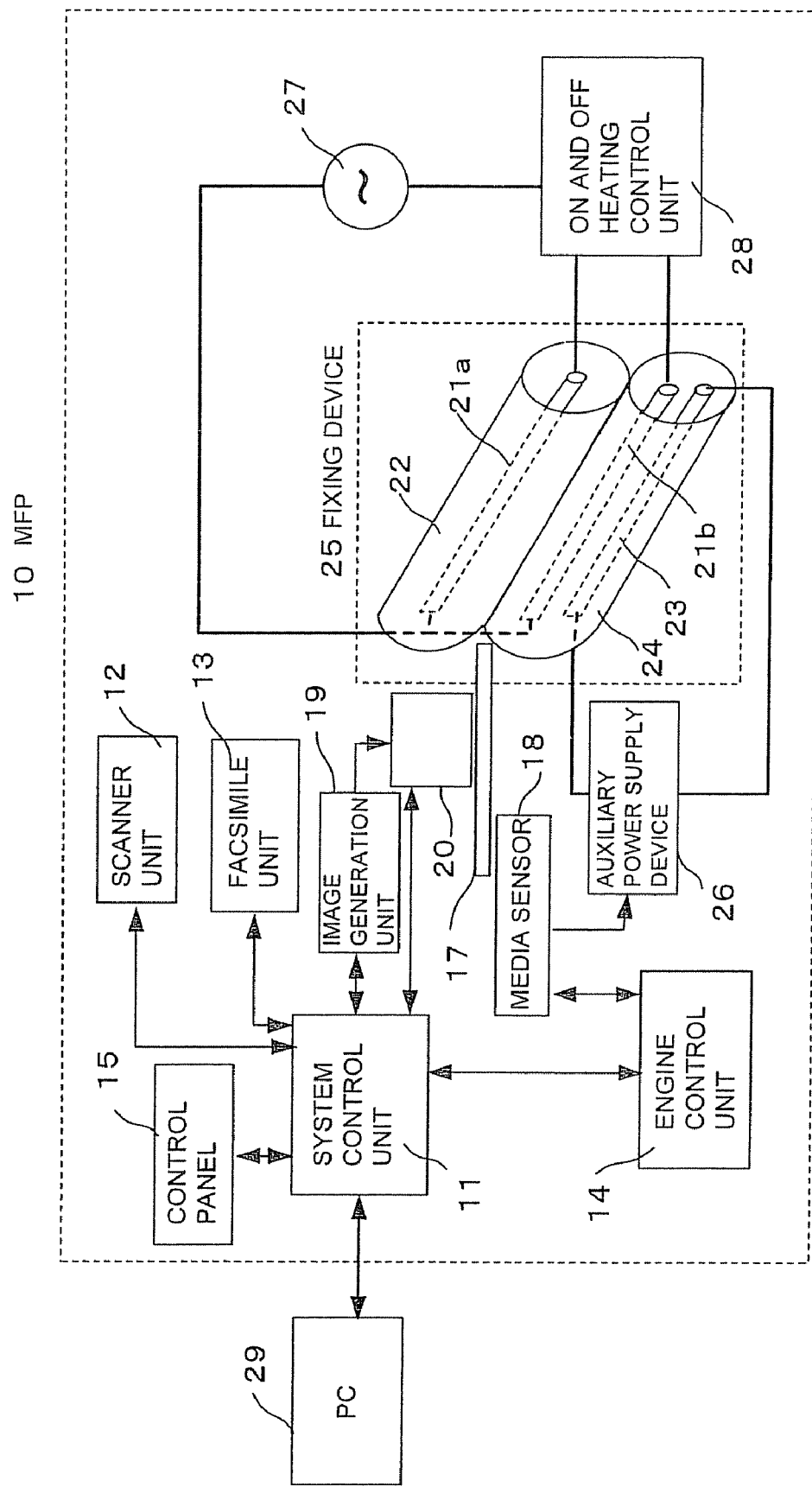
FIG. 1 is a view showing the configuration of an image forming apparatus according to one embodiment of the invention.

FIG. 1 is a view showing the configuration of one embodiment when the invention is applied to an MFP.

The MFP 10 is formed of a system control unit 11 that controls the entire apparatus, a scanner unit 12, a facsimile unit 13, and an engine control unit 14 controlled by the system control unit, a control panel 15 that sends a control signal to the system control unit 11, a media sensor 18 that detects the paper type of a recording paper 17 or the like, an image generation unit 19 that generates an image, a development unit 20 that develops the image generated in the image generation unit 19 on a recording paper 17, a fixing device 25 composed of a heat roller 22 having a main heater 21a inside and a press roller 24 having a main heater 21b and an auxiliary heater 23 inside, an auxiliary power supply device 26 that controls ON and OFF actions of the auxiliary heater 23 upon receipt of a signal relating to the paper type from the media sensor 18, an AC power supply 27, and an ON and OFF heating control unit 28 that is connected to the AC power supply 27 and controls heating of the main heaters 21a and 21b.

A device connected to the MFP 10 from the outside, for example, a personal computer 29, is connected to the system control unit 11 of the MFP 10. The auxiliary power supply device 26 includes an auxiliary power supply that passes a current through the auxiliary heater 23 when auxiliary heating is necessary, a charge and discharge circuit, and a control circuit for these components.

As the main heater 21a enclosed in the heat roller 22, for example, a halogen lamp of about 900 W is used. As the main heater 21b provided inside the press roller 24, for example, a halogen lamp of about 300 W is used. As the auxiliary heater 23, for example, a halogen lamp of about 500 W is used. The auxiliary power supply and the ON and OFF control heating control unit 28 convert an alternating current to a direct current and pass a direct current through these halogen lamps. The auxiliary heater 23 may be provided inside the heat roller 22. A heating method in the fixing device is not limited to a method of having the heater inside the roller, and a fixing portion may be heated by means of induction heating (IH).

The MFP 10 has at least three modes: a copy mode, a facsimile mode, and a print mode. In the copy mode, it is able to capture an image from the scanner unit 12, generate the image in the image generation unit 19, develop the image on a recording paper 17 in the development unit 20, and fix the image in the fixing device 25. In the facsimile reception mode, it is able to take in a facsimile signal sent from the outside into the facsimile unit 13, reproduce an image in the image generation unit 19, develop the image on a recording paper 17 in the development unit 20, and discharge the recording paper 17 to the outside after the developed image is fixed in the fixing device 25. In a facsimile transmission mode, it is able to scan a transmission original document in the scanner unit 12 first, then convert the image into a facsimile signal, and transmit the facsimile signal to the outside via the facsimile unit 13.

In the print mode, it is in a mode in which, for example, a display image on the personal computer 29 connected to the MFP is printed. After an image signal of the personal computer 29 is taken into the image generation unit 19 via the system control unit 11 of the MFP 10, the image signal is sent to the development unit 20, and the image is developed on a recording paper 17 in the development unit 20. Thereafter, the recording paper 17 is sent to the fixing device 25 for the developed image to be fixed thereon and discharged to the outside.

The control on these modes is inputted as the user selects, for example, icons of the copy mode, the facsimile mode, and the print mode displayed on the control panel, and control signals of these modes are sent to the system control unit 11 for the processing desired by the user to be performed.

The engine control unit 14 has the capability to perform mechanical control chiefly using motors, such as scan on original documents in the scanner unit 12, feeding of recording papers 17, rotational control of the heat roller 22 and press roller 24 in the fixing device 25. Overall control on the engine control unit 14, the scanner unit 12, and the facsimile unit 13 is performed by the system control unit 11.

The fixing device 25 performs heat fixing by nipping the recording paper 17 bearing the image developed on the recording paper 17 between the heat roller 22 and the press roller 24. The heat roller 22 is heated by passing a current through the main heater 21a provided inside thereof, and the press roller 24 is heated by passing a current through the main heater 21b and the auxiliary heater 23 provided inside thereof. A current is passed through the main heater 21a inside the heat roller 22 and the main heater 21b inside the press roller 24 by converting an alternating current to a direct current through the ON and OFF control by the ON and OFF heating control unit 28.

Meanwhile, a current is passed through the auxiliary heater 23 inside the press roller 24 by the auxiliary power supply 26 connected thereto.

The media sensor 18 determines the paper type of the recording paper 17, and determines as being the plain paper, the thick paper 1, the thick paper 2, the thick paper 3, or the thick paper 4 by the weight per unit, for example, the basic weight described above.

Besides the foregoing, the media sensor 18 is able to determine the paper type using a magnetic sensor, or a distance measuring sensor that detects a paper thickness by measuring rotations of the roller that feeds the recording paper and a moving distance in that instance.

Figure 2:
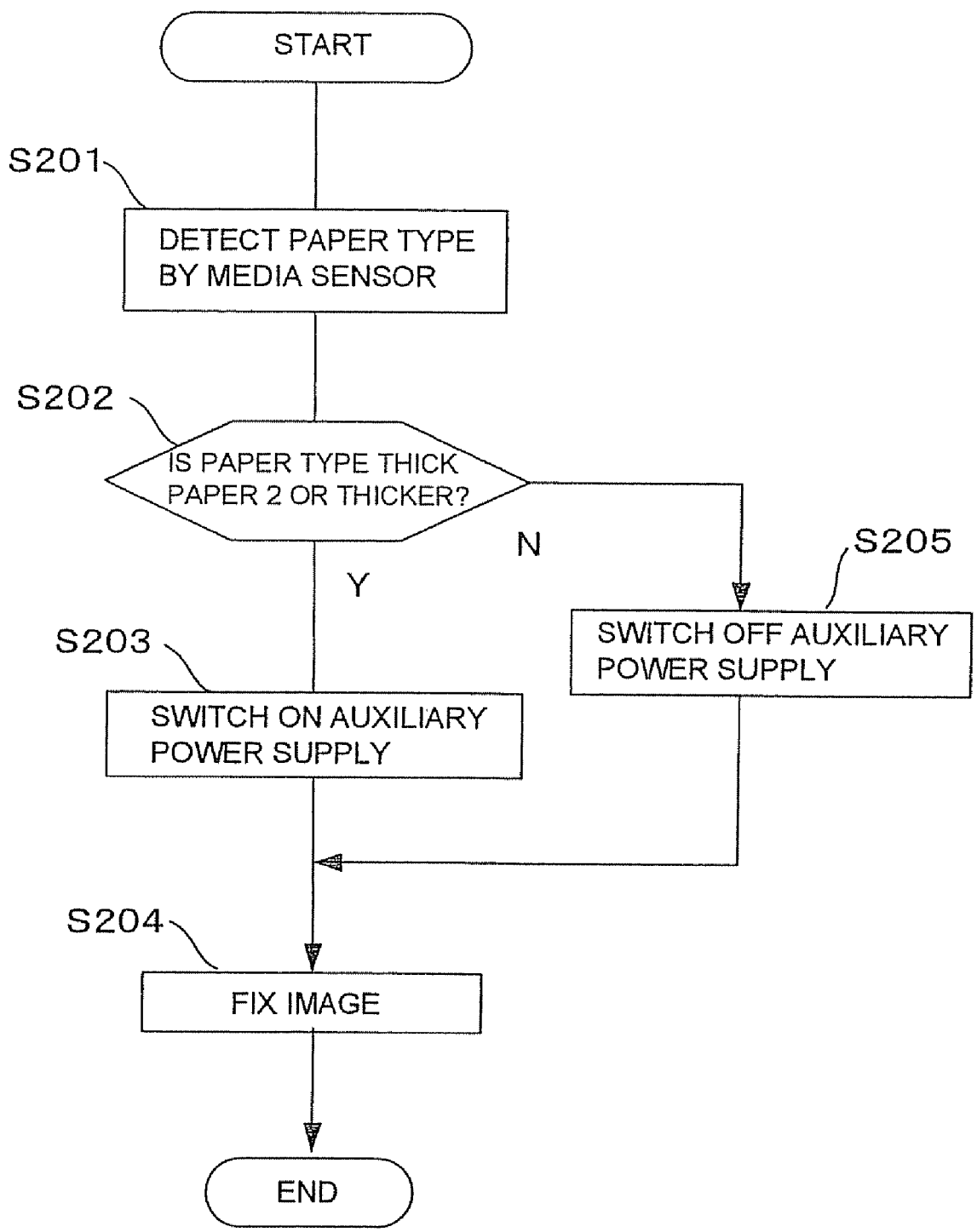
FIG. 2 is a view showing the flowchart used to describe operations of the image forming apparatus shown in FIG. 1.

Operations of the MFP of this embodiment will now be described with the use of the flowchart of FIG. 2. Initially, in a case where the mode of the MFP 10 is switched to either the copy mode or the print mode, in Step S201, the media sensor 18 determines the paper type of the recording paper 17 from the weight per unit. In subsequent Step S202, whether the weight per unit of the recording paper 17 is equal to or greater than a specific value, that is, whether the recording paper 17 is the thick paper 2, the thick paper 3, or the thick paper 4, is detected from the detection result. In a case where the recording paper 17 is the thick paper 2 (164 to 209 g/m$^2$) or thicker, the auxiliary power supply of the auxiliary power supply device 26 is switched ON in Step S203. When the auxiliary power supply comes ON, a direct current passes through not only the main heater 21b but also the auxiliary heater inside the press roller 24.

Printing is executed in subsequent Step S204. More specifically, the image is fixed as the recording paper 17, on which the image has been developed in the development unit 20, passes through a space between the heat roller 22 and the press roller 24 in the fixing device 25. In this instance, when the recording paper 17 is the thick paper 2 or thicker as described above, a current passes through not only the main heater 21b but also the auxiliary heater 23 inside the press roller 24, which stabilizes the fixing temperature at the time of image fixing.

Meanwhile, in a case where the recording paper 17 is determined as being the plain paper or the thick paper 1 by the media sensor 18 in Step S202, the flow proceeds to Step S205 to switch OFF the auxiliary power supply of the auxiliary power supply device 26. Thereafter, the recording paper 17 bearing the image developed in the development unit 20 is inserted into a space between the heat roller 22 and the press roller 24 in the fixing device 25 for the image to be fixed thereon (Step S204).

In this instance, a current passes through the main heater 21b inside the press roller 24 but no current passes through the auxiliary heater 23.

As has been described, in a case where the recording paper 17 is the plain paper (basic weight of 64 to 105 g/m$^2$) or the thick paper 1 (basic weight of 106 to 163 g/m$^2$), the auxiliary heater 23 goes OFF. In a case where the recording paper is the thick paper 2 (basic weight of 164 to 209 g/m$^2$) or thicker, the auxiliary heater 23 comes ON to stabilize the fixing temperature of the image, which makes it possible to achieve a satisfactory fixed image.

The ON and OFF control on the auxiliary heater 23 may be performed by determining whether the basic weight is that of the thick paper 1 or thinner or by determining whether the basic weight is that of the thick paper 2 or thicker.

Second Embodiment

Figure 3:
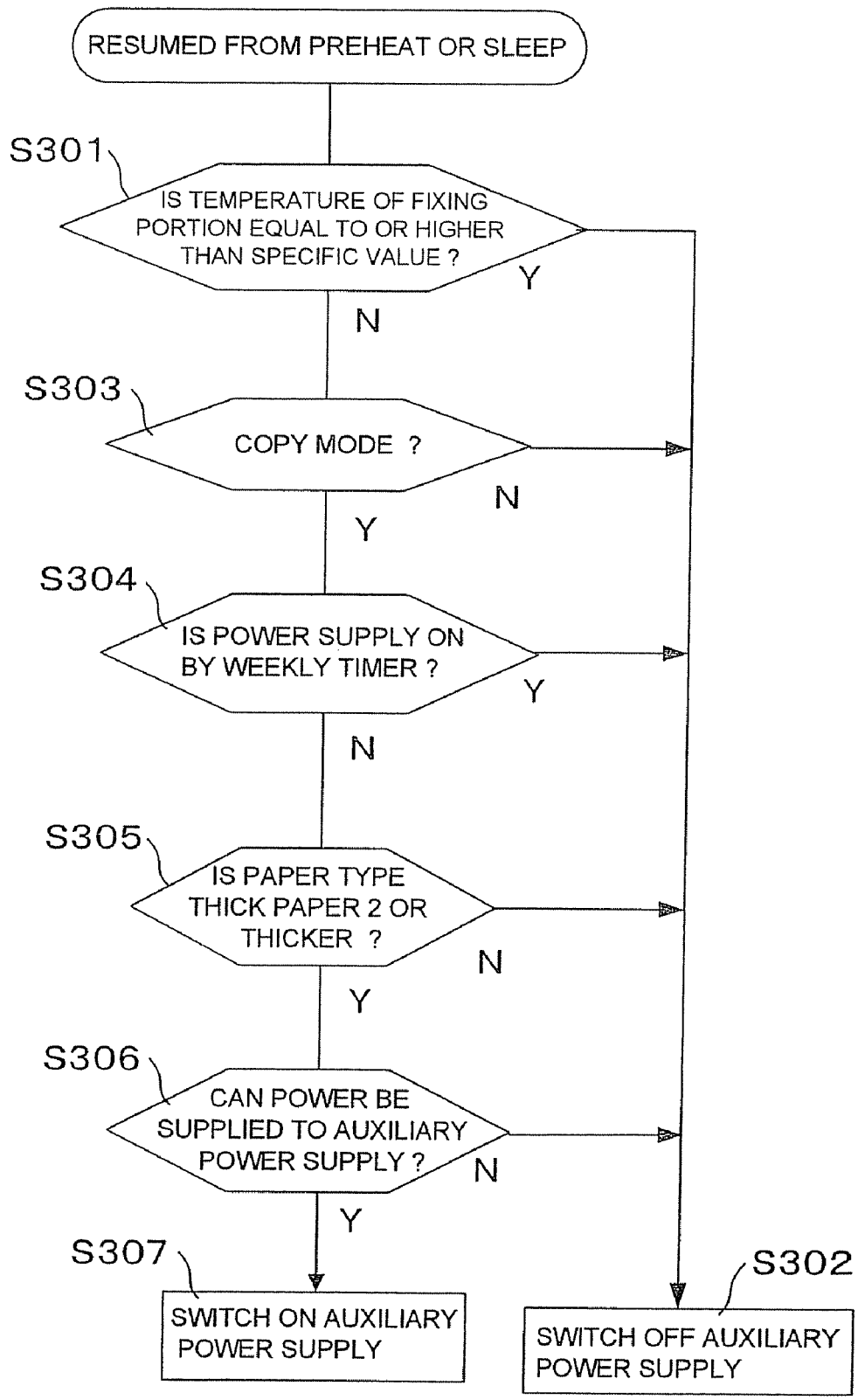
FIG. 3 is a view showing the flowchart used to describe operations in the case of a copy mode or a print mode in an example when the invention is applied to an MFP.
Figure 4:
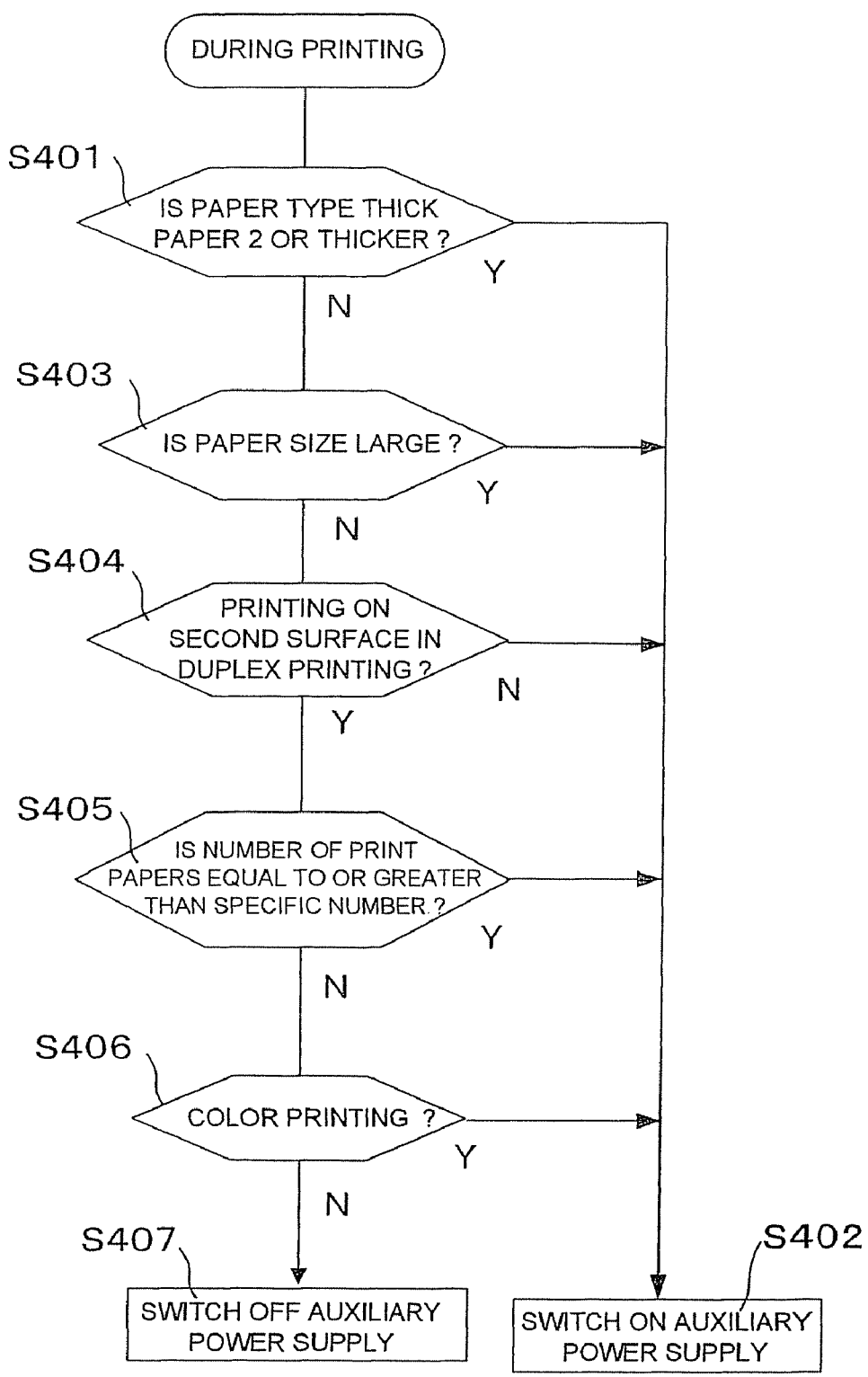
FIG. 4 is a view showing the flowchart used to describe operations in the case of the print mode.

A second embodiment of the invention will now be described. An MFP used in this embodiment is almost the same as the apparatus shown in FIG. 1. FIG. 3 shows the flow of the processing when the apparatus is resumed from a preheat state or resumed from a sleep state. FIG. 4 shows the flow of the processing during the printing.

Initially, when the apparatus is resumed from the preheat state or resumed from the sleep state, the temperature of the image fixing portion of the fixing device 25 is detected in Step S301 of FIG. 3 to detect whether this temperature is equal to or higher than a specific value. In a case where the temperature of the image fixing portion is equal to higher than the specific value, the auxiliary power supply is switched OFF in Step S302.

When the temperature of the image fixing portion is equal to or higher than the specific value in Step S301, because the warming-up will end shortly, there is no need to raise the heating temperature using the auxiliary heater 23. Hence, the auxiliary power supply is not switched ON.

Meanwhile, in a case where the temperature of the image fixing portion of the fixing device 25 has not reached the specific value in Step S301, whether the mode of the MFP 10 is the copy mode is determined in subsequent Step S303. When the mode is switched to the copy mode, it is assumed that the user stands nearby the MFP and wishes to make copies as soon as possible. It is therefore necessary to switch ON the auxiliary power supply. However, in the mode other than the copy mode, the auxiliary power supply is switched OFF in Step S302 because there is no such a need.

Through an input from the control panel 15, the user is able to make settings as to whether the auxiliary power supply is switched ON or OFF when any mode from the copy mode, the facsimile mode, and the print mode is selected. Even in a case where the settings have been made with the print mode, when a connection is established with the personal computer 29, it is possible to set the MFP 10 to the print mode from the personal computer.

In subsequent Step S304, when the power supply stays ON by the settings of the weekly timer being used, because the MFP 10 is not used immediately, the flow proceeds to Step S302 to switch OFF the auxiliary power supply.

In subsequent Step S305, it is detected whether the paper type of the recording paper 17 is the thick paper 2 or thicker, that is, any one of the thick paper 2, the thick paper 3, and the thick paper 4. This detection is made by the media sensor 18, and when the recording paper 17 is not equal to the thick paper 2 or thicker, that is, the plain paper or the thick paper 1, the auxiliary power supply of the auxiliary power supply device 26 is switched OFF in Step S302. Hence, no current passes through the auxiliary heater 23.

In Step S306, a charge capacity of the auxiliary power supply is detected to detect whether it is possible to supply power to the auxiliary power supply. When power can be supplied to the auxiliary power supply, the flow proceeds to Step S307 to switch ON the auxiliary power supply. However, in a case where power cannot be supplied to the auxiliary power supply in Step S306 even when it is preferable to switch ON the auxiliary power supply under the conditions up to Step S305, the auxiliary power supply is switched OFF in Step S302.

Either the auxiliary power supply is switched OFF in Step S302 or the auxiliary power supply is switched ON in Step S307, after which the image fixing on the recording paper is performed as needed.

Operations of the MFP 10 during the printing will now be described with the use of FIG. 4. In Step S401, it is detected by the media sensor 18 whether the paper type of the recording paper 17 is the thick paper 2 or thicker, that is, any one of the thick paper 2, the thick paper 3, or the thick paper 4. When the paper type of the recording paper 17 is the thick paper 2 or thicker, the flow proceeds to Step S402 to switch ON the auxiliary power supply of the auxiliary power supply device 26 to start printing.

In subsequent Step S403, when the size of the recording paper 17 is found to be large, for example, an A-3 size or a long paper having a length of 1200 mm, the flow also proceeds to Step S402 to switch ON the auxiliary power supply. In subsequent Step S404, it is detected whether the second surface is being printed after the first surface is printed in duplex printing. In the case of the printing on the first surface, the auxiliary power supply is switched ON. However, in the case of the printing on the second surface, because the recording paper has been heated, the auxiliary power supply is switched OFF.

In Step S405, whether the number of papers to be printed inputted in advance is equal to or greater than a specific number, for example, 100, is detected. When the number of papers is equal to or greater than the specific number, the flow proceeds to Step S402 to start developing and fixing of the image after the auxiliary power supply is switched ON. The purpose of this configuration is to avoid the occurrence of poor fixing resulting from a drop of the fixing temperature when the number of papers to be printed becomes larger.

In subsequent Step S406, whether the setting inputted in advice is color copy printing is detected, and in the case of color copy printing, the auxiliary power supply is switched ON and developing and fixing of the image are performed in Step S402.

This is because the fixing performance is high for monochrome copying whereas the fixing performance is insufficient in color coping and fixing can be performed more satisfactorily when the auxiliary power supply is switched ON. When the setting is found not to be the color printing, that is, the setting is found to be the monochrome printing, in Step S406, developing and fixing of the image is performed after the auxiliary power supply is switched OFF in Step S407.

The embodiment above described a case where the invention is applied to an MEP having three modes: the copy mode, the facsimile mode, and the print mode. It should be appreciated, however, that the invention is also applicable to an MFP having these three modes or an MFP having four or more capabilities.

The embodiment above described a case where the paper type is determined by the weight per unit, that is, the basic weight, and the paper type includes five types: plain paper, thick paper 1, thick paper 2, thick paper 3, and thick paper 4. In the invention, however, the paper type is not limited to five types and the weight may be detected in any other unit. The invention is also applicable to a case where the paper type is determined by the thickness of recording papers using the distance measuring sensor besides the weight. It is also possible to determine the paper type by a magnetic sensor.

In the embodiment above, the auxiliary heater is provided inside the press roller. However, it may be provided inside the heat roller or it may be provided inside both the press roller and the heat roller.

According to the embodiment, the auxiliary power supply can be switched ON and OFF in a fine-tuned manner under various conditions. Hence, it is possible to achieve an MFP that is able to perform fixing satisfactorily while being capable of not only shortening a stand-by time but also saving power.

In addition, in the invention, because the auxiliary power supply is controlled to be merely switched ON and OFF and does not need complex control, for example, to raise the fixing temperature of the roller appropriately, an image forming apparatus of a simple configuration can be achieved. In a case where the power supply of the auxiliary power supply is a rechargeable battery, it is possible to reduce the number of charging operations and to shorten a charging time, which can in turn extend the life time of the auxiliary power supply. Further, it is possible to reduce power consumption of the MFP.

The embodiment above described a case where the invention is applied to an MFP. The invention, however, is also applicable to a copying machine, a printer, a facsimile machine, and so forth.

It should be appreciated that the invention is not limited to the embodiment described above, and various modifications are possible within the scope of the technical idea of the invention.

What is claimed is:

1. An image forming apparatus, comprising:
   a media sensor that detects a type of a recording paper by one of a weight per unit and a thickness of the recording paper;
   a development unit configured to develop an image on the recording paper;
   a pair of rollers that fixes the image on the recording paper by nipping the recording paper bearing the image developed in the development unit and forcing the recording paper to pass by;
   a main heater that heats the pair of rollers by passing a current therethrough when the recording paper passes by; and
   an auxiliary heater that selectively heats at least one of the pair of rollers using an auxiliary power supply when the recording paper passes by the pair of rollers by passing a current therethrough in a case where the media sensor detects that one of the weight per unit of the recording paper and the thickness of the recording paper is equal to or greater than a specific value, wherein:
   the main heater is provided inside each of the pair of rollers to heat the rollers by passing a current therethrough, and the auxiliary heater is provided inside one of the pair of rollers to heat the roller provided with the auxiliary heater by passing a current through the auxiliary power supply connected to the auxiliary heater.

2. The image forming apparatus according to claim 1, wherein:
   the main heater and the auxiliary heater are formed of halogen lamps.

3. An image forming apparatus, comprising:
   a media sensor that detects a type of a recording paper by one of a weight per unit and a thickness of the recording paper;
   a development unit that develops an image on the recording paper;
   a pair of rollers that fixes the image on the recording paper by nipping the recording paper bearing the image developed in the development unit and forcing the recording paper to pass by;
   a pair of main heaters provided inside the pair of rollers, respectively;
   a main power supply connected to the pair of main heaters to pass a current therethrough;
   an auxiliary heater provided to at least one of the pair of rollers; and
   an auxiliary power supply connected to the auxiliary heater to pass a current therethrough when the media sensor detects that one of the weight per unit of the recording paper and the thickness of the recording paper is equal to or greater than a specific value.

4. The image forming apparatus according to claim 3, wherein:
   the main heater and the auxiliary heater are formed of halogen lamps.

5. The image forming apparatus according to claim 3, wherein:
   the auxiliary power supply passes a current to the auxiliary heater when the recording paper passes by the pair of rollers.

6. A multi function peripheral having at least a copy mode and a facsimile mode, comprising:
   a media sensor that detects a type of a recording paper by one of a weight per unit and a thickness of the recording paper;
   a development unit configured to develop an image on the recording paper;
   a pair of rollers that fixes the image on the recording paper by nipping the recording paper bearing the image developed in the development unit and forcing the recording paper to pass by;
   a main heater that heats the pair of rollers when the recording paper passes by; and
   an auxiliary heater that selectively heats at least one of the pair of rollers by passing a current therethrough when the recording paper passes by in a case where the media sensor detects that one of the weight per unit of the recording paper and the thickness of the recording paper is equal to or greater than a specific value, wherein:
   a current is passed through the auxiliary heater when switched to the copy mode to heat the roller provided with the auxiliary heater.

7. The multi function peripheral according to claim 6, wherein:
   the pair of rollers includes a heat roller and a press roller, and the auxiliary heater is provided inside the press roller.

8. The multi function peripheral according to claim 6, wherein:
   the main heater and the auxiliary heater are formed of halogen lamps.

9. A heat fixing method in an image forming apparatus for performing fixing by heating a recording paper by forcing the recording paper to pass through a space between a pair of rollers after an image is developed on the recording paper, comprising:
   detecting a type of a recording paper by a media sensor by one of a weight per unit and a thickness of the recording paper;
   developing an image on the recording paper in a development unit; and
   passing a current through main heaters provided inside a pair of rollers by nipping the recording paper bearing the image developed in the development unit and forcing the recording paper to pass by the pair of rollers, and fixing the image on the recording paper by selectively heating the roller provided with an auxiliary heater by passing a current through the auxiliary heater provided inside at least one of the pair of rollers when the recording paper passes by the pair of rollers in a case where the media sensor detects that one of the weight per unit of the recording paper and the thickness of the recording paper is equal to or greater than a specific value.

10. The heat fixing method in an image forming apparatus according to claim 9, wherein:
    the auxiliary power supply connected to the auxiliary heater passes a current through the auxiliary heater when the recording paper passes by the pair of rollers.

11. A heat fixing method in an image forming apparatus for performing fixing by heating a recording paper by forcing the recording paper to pass through a space between a pair of rollers after an image is developed on the recording paper, comprising:

detecting a type of a recording paper by a media sensor by one of a weight per unit and a thickness of the recording paper;

developing an image on the recording paper in a development unit; and passing a current to a main power supply connected to main heaters provided inside the pair of rollers by nipping the recording paper bearing the image developed in the development unit and forcing the recording paper to pass by the pair or rollers, and performing fixing of the image on the recording paper by selectively heating the roller provided with an auxiliary heater by passing a current to an auxiliary power supply connected to the auxiliary heater provided inside at least one of the pair of rollers when the recording paper passes by the pair of rollers in a case where the media sensor detects that one of the weight per unit of the recording paper and the thickness of the recording paper is equal to or greater than a specific value.

* * * * *